Aug. 17, 1948.           H. E. CONRAD           2,447,162
DOLLY BLOCK WITH SERRATED WORK-ENGAGING FACES
Filed April 2, 1946
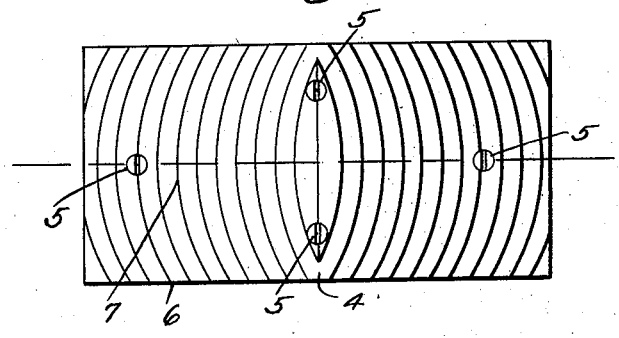
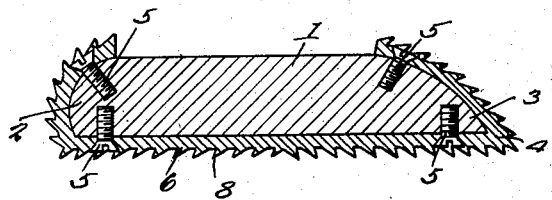
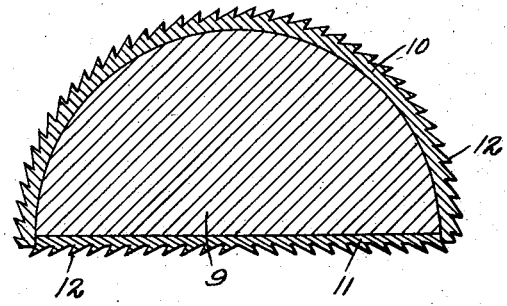
H. E. Conrad
INVENTOR.
BY
ATTORNEYS.

Patented Aug. 17, 1948

2,447,162

UNITED STATES PATENT OFFICE 2,447,162

DOLLY BLOCK WITH SERRATED WORK-ENGAGING FACES

Harry E. Conrad, Pomona, Calif.

Application April 2, 1946, Serial No. 659,082

1 Claim. (Cl. 81—15)

My present invention relates to an improved dolly block with serrated work-engaging faces and more particularly to the type of tool generally referred to as a dolly for use an an anvil applied under the work to receive the force of the blow from a hammer to straighten or work the sheet metal.

The dolly is particularly adapted for use by automobile body repairmen, and is suitable for use in straightening body damages.

In the usual dolly however, the surface is smooth and the dolly will creep and will permit the work to stretch. This condition is undesirable for it makes longer jobs in that the work will have to be shrunk after the job is straightened and the shrinking process is not always perfect in restoring the work to its original undamaged condition and size.

I therefore have provided the dolly of my invention with serrations or teeth, pitched angularly with relation to the dolly surface in order that the dolly may bite into the work at many points and hold the work in position.

In the accompanying drawings I have illustrated one complete example of the physical embodiment of my invention according to the best mode I have thus far devised, but it will be understood that changes and alterations in the exemplified structure may be made within the scope of the appended claim.

In the drawings:

Figure 1 is a bottom plan view of the dolly of my invention.

Figure 2 is a longitudinal sectional view thereof.

Figure 3 is a transverse sectional view of a modified form of the dolly of my invention.

Referring now to the drawings wherein I have illustrated the dolly of my invention having two conventional forms, in Figures 1 and 2, the block 1 is the equivalent of a normal dolly and is made of hard steel and formed with a rounded end 2 and a pointed or tapered end 3. The end shapes provide for the use of the dolly under various portions of the automobile sheet metal parts such as fenders, and body contours.

A sheet metal covering 4 is bent to shape and is secured to the dolly as by countersunk screws 5.

To maintain the dolly in the desired position under the work to be hammered I provide the rows of angularly disposed teeth or ridges 6 formed in arcuate curves as 7 across the face of the dolly.

These ridges or serrations terminate in sharp biting edges 8 and two or more rows of the teeth will bite into the metal being hammered and will prevent the stretching of the metal.

As is seen in the drawings the teeth or ridges 6 are fashioned in opposed sections, the pitch of the teeth of the sections being divergent, and the arcs of the ridges being convergent. The tendency of these divergently pitched teeth will be to prevent the work from stretching and will also prevent the dolly from creeping.

The teeth 6 as shown are approximately equal in depth to the thickness of the sheet metal covering in order that the penetration may be deep enough to accomplish the described purposes.

In Figure 3 I have shown a different form of dolly 9 with hard steel coverings 10 and 11 thereon. The teeth 12 are similar in construction to the teeth described in Figures 1 and 2 and operate in the same manner.

An important feature of the invention is found in the fact that when the teeth become worn, the hard toothed portion can be quickly removed and a new one substituted. As the body need not be renewed, the cost of renewal comes much less than would be the case should the tooth be formed directly on the body or block.

Having thus fully described my invention what I claim as new and desire to secure by Letters Patent is:

A metal-working tool including a dolly block proportioned to be manually gripped and held against a part of a metal body to be straightened, and a removable hard steel covering for said block, the covering enveloping the work-engaging faces and edges of said block and having an outer work-engaging surface formed at either side of its center line with a plurality of ridges each of which is longitudinally curved and has its ends disposed toward said center line, each ridge being formed with a continuous unbroken biting edge pitched away from said center line.

HARRY E. CONRAD.

REFERENCES CITED

The following references are of record in the file of this patent:

UNITED STATES PATENTS

| Number | Name | Date |
|---|---|---|
| 16,525 | Brigham | Feb. 3, 1857 |
| 405,191 | Urschel | June 11, 1889 |
| 1,048,100 | Rorig | Dec. 24, 1912 |
| 2,263,247 | Raisanen | Nov. 18, 1941 |
| 2,357,726 | Carter | Sept. 5, 1944 |